United States Patent [19]

Kosaka et al.

[11] Patent Number: 5,924,067
[45] Date of Patent: Jul. 13, 1999

[54] SPEECH RECOGNITION METHOD AND APPARATUS, A COMPUTER-READABLE STORAGE MEDIUM, AND A COMPUTER-READABLE PROGRAM FOR OBTAINING THE MEAN OF THE TIME OF SPEECH AND NON-SPEECH PORTIONS OF INPUT SPEECH IN THE CEPSTRUM DIMENSION

[75] Inventors: Tetsuo Kosaka, Zama; Yasunori Ohora, Yokohama, both of Japan

[73] Assignee: Canon Kabushiki Kaisha, Tokyo, Japan

[21] Appl. No.: 08/821,719

[22] Filed: Mar. 20, 1997

[30] Foreign Application Priority Data

Mar. 25, 1996 [JP] Japan .................................. 8-068046

[51] Int. Cl.⁶ ....................................................... G10L 9/06
[52] U.S. Cl. ......................... 704/256; 704/231; 704/235
[58] Field of Search ..................................... 704/231, 230, 704/222, 226, 245, 250, 255, 256, 254, 235, 233

[56] References Cited

U.S. PATENT DOCUMENTS

| | | | |
|---|---|---|---|
| 4,899,386 | 2/1990 | Ichikawa et al. ......................... | 701/213 |
| 5,208,863 | 5/1993 | Sakurai et al. ........................... | 704/231 |
| 5,220,629 | 6/1993 | Kosaka et al. ........................... | 704/254 |
| 5,353,408 | 10/1994 | Kato et al. ............................... | 702/226 |
| 5,369,728 | 11/1994 | Kosaka et al. ........................... | 704/254 |
| 5,381,514 | 1/1995 | Aso et al. ................................ | 704/241 |
| 5,459,815 | 10/1995 | Aikawa et al. .......................... | 704/254 |
| 5,522,012 | 5/1996 | Mommone et al. ..................... | 704/250 |
| 5,590,242 | 12/1996 | Juang et al. ............................. | 704/245 |
| 5,598,505 | 1/1997 | Austin et al. ............................ | 704/226 |
| 5,621,849 | 4/1997 | Sakurai et al. .......................... | 704/264 |
| 5,677,990 | 10/1997 | Junqua .................................... | 904/255 |

FOREIGN PATENT DOCUMENTS

| | | | |
|---|---|---|---|
| 442 342 A1 | 8/1991 | European Pat. Off. | .......... G10L 3/02 |
| 459 364 A1 | 12/1991 | European Pat. Off. | .......... G10L 3/02 |

OTHER PUBLICATIONS

Rahim, et al., "Signal Bias Removal for robust Telephone Based Speech Recognition in Adverse Environments", Proc. of ICASSP, '94, (1994), pp. I–445–448.

M. J. Gales, S. Young, "An Improved Approach to the Hidden Markov Model Decomposition of Speech and Noise", Proc. of ICASSP, '92, pp. I–233–236, (1992).

*Primary Examiner*—Richemond Dorvil
*Attorney, Agent, or Firm*—Fitzpatrick, Cella, Harper & Scinto

[57] ABSTRACT

An apparatus and method for speech recognition includes a device and a step for obtaining a mean of the time of a speech portion in the Cepstrum dimension from the speech portion of the input speech, a device and step for obtaining a mean of a time of the non-speech portion in the Cepstrum dimension from the non-speech portion of the input speech, a device and step for converting each mean time from a Cepstrum region to a linear region, and after that, subtracting it on a linear spectrum dimension, converting the subtracted mean into a Cepstrum dimension, subtracting a mean of a time of a speech portion in a Cepstrum dimension in a speech database for learning from the converted result, and adding the subtracted result to a speech model expressed by Cepstrum. By this arrangement, even when noise is large, the presumed precision of a line fluctuation is raised and the recognition rate can be improved.

22 Claims, 3 Drawing Sheets

SPEECH RECOGNITION METHOD AND APPARATUS, A COMPUTER-READABLE STORAGE MEDIUM, AND A COMPUTER-READABLE PROGRAM FOR OBTAINING THE MEAN OF THE TIME OF SPEECH AND NON-SPEECH PORTIONS OF INPUT SPEECH IN THE CEPSTRUM DIMENSION

BACKGROUND OF THE INVENTION

1. Field of the Invention

The invention relates to speech recognizing method and apparatus for enabling speech recognition with a high recognition rate by eliminating distortion of line characteristics and the influence by internal noise.

The invention also relates to a speech recognizing method and apparatus for performing speech recognition by using a hidden Markov model (HMM).

2. Related Background Art

In case of performing speech recognition in an actual environment, the distortion of line characteristics by the influence of a microphone, telephone line characteristics, or the like and additive noise such as internal noise or the like, particularly cause problems. As methods of coping with those problems, a Cepstrum Mean Subtraction (CMS) method and a Parallel Model Combination (PMC) method have been proposed so far. The CMS method has been described in detail in Rahim et al., "Signal Bias Removal for Robust Telephone Based Speech Recognition in Adverse Environments", Proc. of ICASSP, '94, (1994) or the like. The PMC method has been described in detail in M. J. Gales, S. Young, "An Improved Approach to the Hidden Markov Model Decomposition of Speech and Noise", Proc. of ICASSP, '92, I-233-236, (1992).

The CMS method is a method of compensating for the distortion of line characteristics. On the other hand, the PMC method is a method of coping with additive noise. In both of those methods, a noise portion and a speech portion are detected in input speech, and a Hidden Markov Model (HMM) formed in an environment without line distortion and noise is corrected on the basis of that information, thereby allowing it to be adapted to the input environment. With this method, even if the line characteristics or noise fluctuate, it is possible to flexibly cope with such a case.

The CMS method is a method of compensating for multiplicative noise (line distortion) which acts by convoluting of an impulse response. A long time spectrum of input speech is subtracted from the input speech and a long time spectrum of speech used to form a model is subtracted from the model, thereby normalizing the difference between line characteristics. The normalizing process is generally executed in a logarithm spectrum region or Cepstrum region. Since the multiplicative noise appears as an additive distortion in those two regions, the noise can be compensated for by a subtraction. A method of performing the normalizing process in the Cepstrum region between those methods is called a CMS method.

The PMC method is a method of adding and synthesizing an HMM (speech HMM) learned by speech recorded in a noiseless environment and an HMM (noise HMM) learned by noise, thereby making the model further approach a noise multiplexed environment. In the noise process in the PMC, it is presumed that an additiveness of the noise and speech is satisfied in a linear spectrum region. On the other hand, in the HMM, parameters of a logarithm spectrum system, such as Cepstrum or the like, are often used as a feature amount of a speech. According to the PMC method, those parameters are converted into the linear spectrum region and feature amounts, which are obtained from the speech HMM, and noise HMM are added and synthesized in the linear spectrum region. After the speech and noise were synthesized, by performing an inverse conversion, the region is returned from the linear spectrum region to the Cepstrum region, thereby obtaining noise multiplexed speech HMM.

SUMMARY OF THE INVENTION

By using the CMS method as mentioned above, it is possible to cope with the distortion of the line characteristics due to the influence of the microphone, telephone line characteristics, or the like. By using the PMC method, it is possible to cope with additive noise, such as internal noise or the like. Therefore, by combining the CMS and PMC, even when there are line distortion and additive noise, it is possible to simultaneously adapt to them. However, when both of them are simply combined, there is a fear that when an SNR (signal to quantization noise ratio) is low, the line characteristics cannot be properly presumed.

Such a fear is caused by the fact that when the line characteristics are presumed, the additive noise exerts an adverse influence and the line characteristics cannot be properly presumed. More specifically, a large problem occurs when the characteristics of the additive noise are not white noise.

To solve the above problems, according to the invention, there are provided a speech recognizing method and apparatus in which speech including a speech portion and a non-speech portion is inputted, a Cepstrum long time mean of the speech portion is obtained from the speech portion included in the input speech, a Cepstrum long time mean of the non-speech portion is obtained from the non-speech portion included in the input speech, the Cepstrum long time mean of the non-speech portion is subtracted from the Cepstrum long time mean of the speech portion on a linear spectrum dimension, and after that, the resultant mean is converted into a Cepstrum dimension, a Cepstrum long time mean of a speech portion of a database for learning is subtracted from the converted mean, and the resultant mean is further added to a speech model expressed by Cepstrum. Thus, even when the noise is large, since the Cepstrum long time mean is obtained in consideration of the influence of noise, the precision with which the presumption of the line fluctuation is raised, resulting in an improvement in recognition performance.

DETAILED DESCRIPTION OF THE PREFERRED EMBODIMENT

Figure 3:
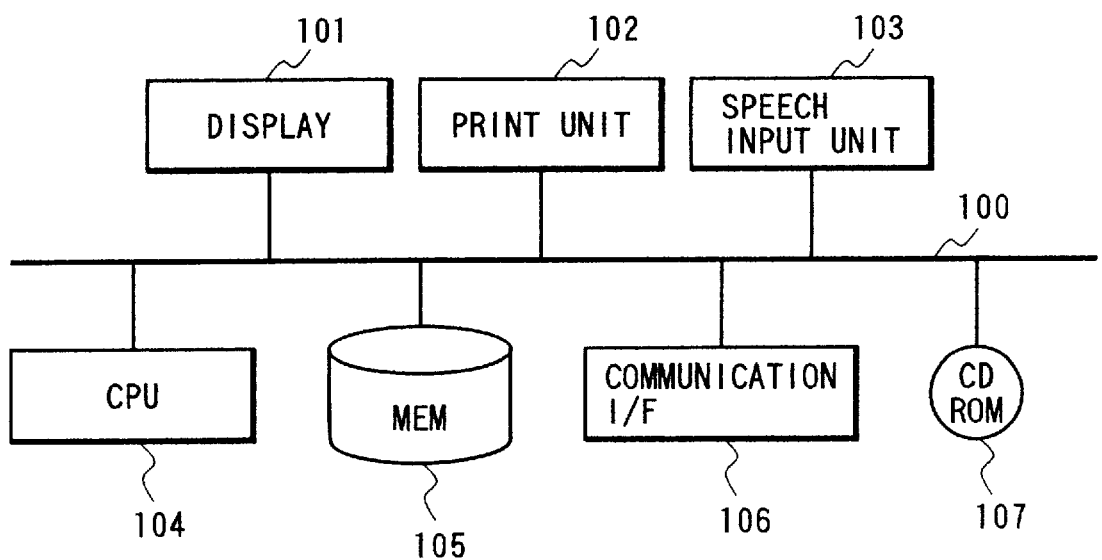
FIG. 3 is a constructional diagram of the speech recognizing apparatus.
Figure 4:
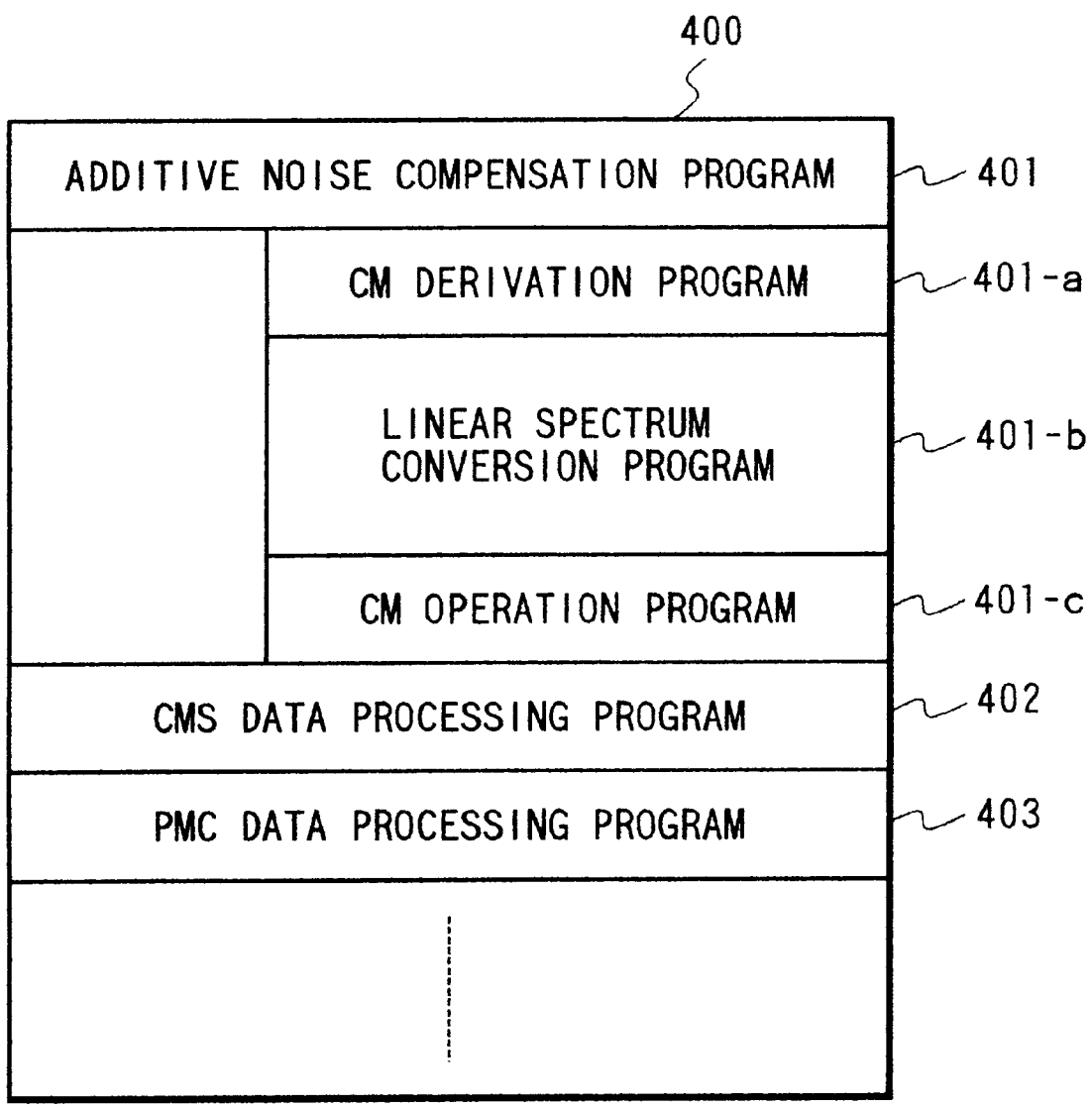
FIG. 4 is a diagram showing a memory map example in a memory.

FIG. 3 is a block diagram showing the construction of a speech recognizing apparatus of the invention. Reference numeral 101 denotes a display such as CRT, a liquid crystal display, or the like, for displaying a character train that is obtained as a result of a speech recognition of the invention; 102 denotes a print unit such as a LBP, an ink jet printer, or the like for printing the character train that is obtained as a result of the speech recognition in the invention; and 103 denotes a speech input unit, such as a microphone or the like. A device for inputting speech through a public line or the like can be also used as a speech input unit 103. Reference numeral 104 denotes a CPU for controlling the device so as to execute various processes, which will be explained hereinlater, in accordance with a control program stored in a memory 105 or a detachable storage medium 107, such as a CD-ROM or the like; and 105 denotes the memory which is provided in the apparatus main body. The memory 105 stores the control programs for various processes which are executed by the CPU 104 and will be explained hereinlater, various parameters (for example, data corresponding to a dictionary that is used for speech recognition, and the like) which are necessary for those processes, speech data to be recognized, and the like. Reference numeral 106 denotes a communication interface (I/F) for controlling communication in order to transmit and receive data through communicating means such as public line, LAN, or the like. It is also possible to construct the device in a manner such that by the communication I/F 106, speech inputted by another apparatus and control programs and various parameters stored in another apparatus are transmitted to the apparatus main body and stored in the memory 105 and, after that, processes, which will be explained hereinlater, are started. Reference numeral 107 denotes the storage medium which is detachable from a main body of, for instance, a CD-ROM, an FD, or the like. The storage medium is a medium which is detachable from the apparatus main body and can store the control program, various parameters, and speech data which have already been described and stored in the memory 105. Before starting processes, which will be explained hereinlater, data can be down-loaded from the storage medium 107 into the memory 105 or the CPU 104 can also directly access to the storage medium 107. FIG. 3 is a memory map of the data stored in the memory 105 or storage medium 107. Control programs for processes as shown at reference numerals 401 to 403 have been stored in the memory map. Although not shown in FIG. 3, the apparatus also has a parameter storing unit, a speech data storing unit, a working area, and the like.

Figure 1:
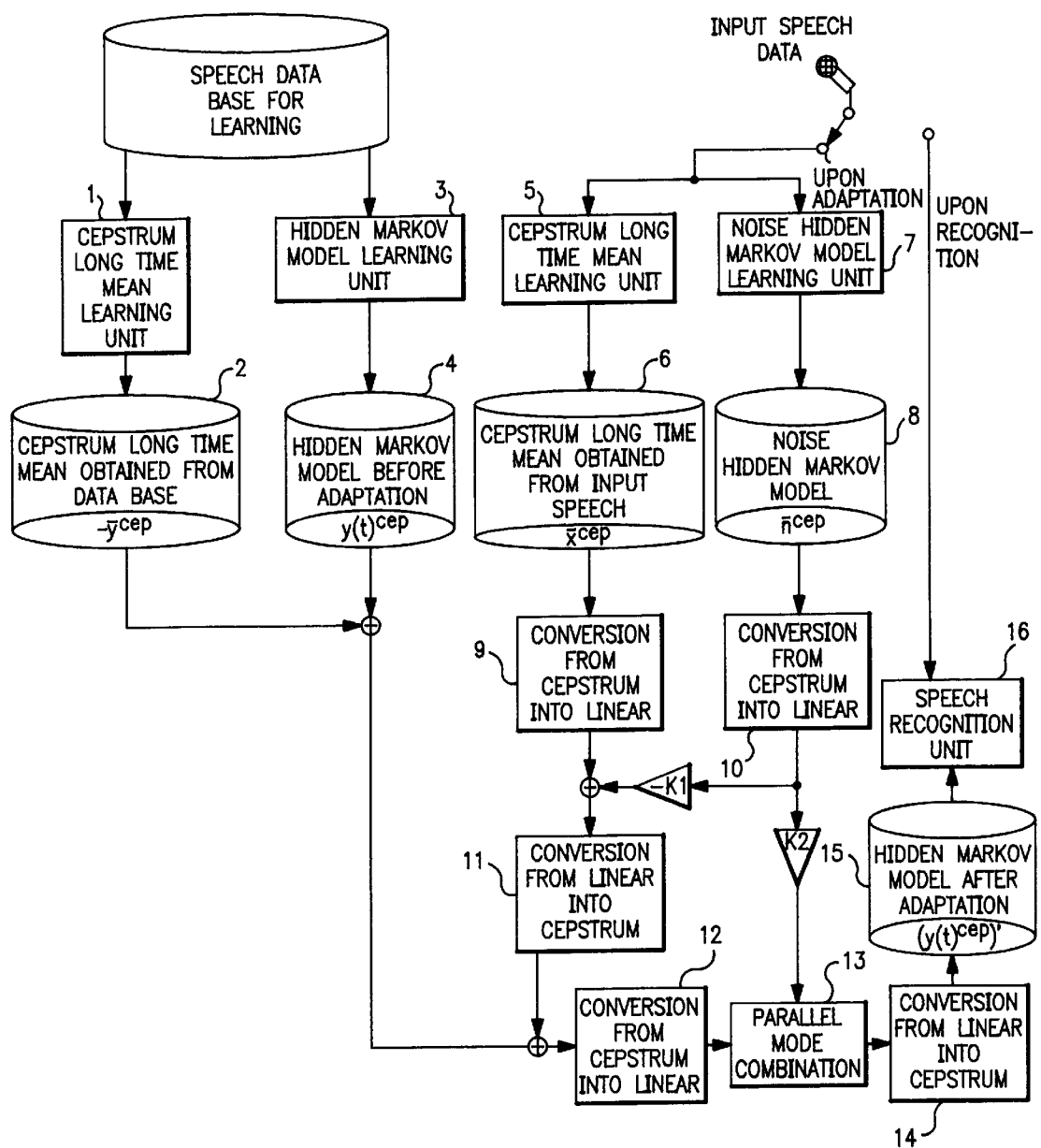
FIG. 1 is a block constructional diagram of a speech recognizing apparatus of the invention.

The embodiment of the invention will now be described in detail hereinbelow with reference to FIG. 1. FIG. 1 is a functional block constructional diagram of a speech recognizing process of the invention. The flow of data can be understood by FIG. 1. In FIG. 1, reference numeral 1 denotes a CM (Cepstrum long time mean) learning unit for calculating a CM from the data on a speech database for learning. The CM learning unit 1 calculates the CM in accordance with a CM derivation program 401-a. Reference numeral 2 denotes a CM [hereinafter, referred to as a CM(2)] which is thus obtained and stored in the memory 105; 3 denotes an HMM learning unit for obtaining an HMM from the data on the speech database for learning; 4 denotes an HMM [hereinafter, referred to as an HMM(4)] which is thus obtained and stored in the memory 105; 5 denotes a CM learning unit for obtaining a CM from a speech portion included in an input speech and obtaining a CM in accordance with the CM derivation program 401-a; 6 denotes a CM [hereinafter, referred to as a CM(6)] which is thus obtained and stored in the memory 105; 7 denotes a noise HMM learning unit for learning a noise HMM from a non-speech portion included in the input speech; 8 denotes a noise HMM [hereinafter, referred to as an HMM(8)] which is thus obtained and stored in the memory 105; and 9 denotes a conversion unit for converting the CM(6) obtained from the speech portion of the input speech into a linear spectrum region from a Cepstrum region. The conversion in the conversion unit 9 is executed in accordance with a linear spectrum conversion program 401-b. Reference numeral 10 denotes a conversion unit for converting the noise HMM(8) from the Cepstrum region to the linear spectrum region. The conversion in the conversion unit 10 is executed in accordance with the linear spectrum conversion program 401-b. Reference numeral 11 denotes a conversion unit for converting from the linear spectrum region to the Cepstrum region; 12 denotes a conversion unit from the Cepstrum region to the linear spectrum region; 13 denotes a PMC execution unit for executing a PMC in accordance with a PMC data processing program 403; 14 denotes a conversion unit for converting a linear spectrum region expression of a model obtained by the PMC into a Cepstrum region; 15 denotes an HMM [hereinafter, referred to as an HMM(15)] that is converted and finally obtained; and 16 denotes a speech recognition unit for performing speech recognition by using the HMM(15).

The present recognizing apparatus operates as an environment adaptive type for fetching a part of the input speech and performing an adaptation of a model by data fetched. The operation in an environment adaptive mode will be first described. First, the input speech inputted by the speech input unit 103 is divided into a speech portion and a non-speech portion without speech. It is assumed that the input speech has been converted into a parameter such as a Cepstrum or the like. An HMM for noise is first learned by the noise HMM learning unit 7 by using the data of the non-speech portion on the basis of an ordinary Baum-Welch algorithm. Thus, the noise HMM(8) can be formed. A long time mean of the Cepstrum of the speech portion of the input speech is calculated by the CM learning unit 5. Each of them is converted from the Cepstrum region to the linear spectrum region. A converting method in this example has been described in detail in the forgoing literature of M. J. Gales, et al. In the conversion in this case, only the mean value is used in the CM(6) of the speech portion and the mean value and divergent value are used with respect to the noise HMM(8). An expression in a linear spectrum region CM(6)' of the CM(6) calculated from the speech portion of the input data is shown below.

$$CM(6)' = \bar{x}^{lin}$$

An expression of the linear spectrum region of the mean value among parameters of the HMM(8) calculated from the non-speech portion is shown below.

$$HMM(8)' = \bar{n}^{lin}$$

In the above equation, a superscript "lin" denotes a linear spectrum expression. Subsequently, a calculation shown by the following equation (1) is executed.

$$\bar{x}'^{lin} = \bar{x}^{lin} - K_1 \bar{n}^{lin} \tag{1}$$

A calculation result is converted from the linear spectrum expression to the Cepstrum expression by the conversion unit 11. This conversion is as shown below.

$$\bar{x}'^{cep}$$

A presumption error of the CM(6) of the input speech can be reduced by the subtraction shown in the equation (1). $K_1$ denotes a constant and an argument cep shows a Cepstrum expression.

Subsequently, the CM(2) is calculated in the CM learning unit 1 by using partial data in the speech database for learning.

$$CM(2) = \bar{y}^{cep} \qquad (5)$$

Likewise, the HMM(4) in which a phoneme, a word, or the like for speech recognition is set to a unit is learned by the HMM learning unit 3 by using partial data in the speech database for learning. A mean value among the parameters of the HMM is shown as follows.

$$HMM(4)' = \bar{y}(t)^{cep}$$

The above mean value becomes a mean value parameter of the HMM which doesn't correspond to noise or a line fluctuation before adaptation. Although a speech recognition can be performed by using the HMM(4)', when it is influenced by the noise or line fluctuation, the recognition rate deteriorates. A calculation shown in the following equation (2) is now executed.

$$HMM(4)'' = y(t)^{cep} - \bar{y}^{cep} + \bar{x}^{rcep} \qquad (2)$$

Thus, the mean value in the HMM(4) obtained by the HMM learning unit 3 is converted and HMM(4)" is obtained. The HMM(4)" obtained here copes with only the line fluctuation in the noise and line fluctuation.

Figure 2:
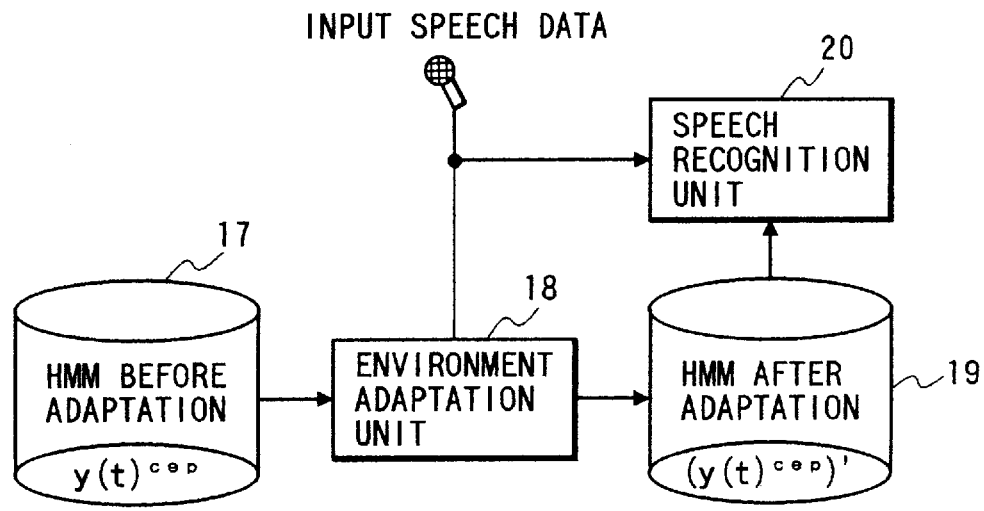
FIG. 2 is a block constructional diagram of another speech recognizing apparatus.

The HMM(4)" is converted by the conversion unit 12 from the Cepstrum expression to the linear spectrum expression. In the PMC 13, a constant $K_2$ is multiplied to a noise HMM(8)' derived from the conversion unit 10 by the PMC execution unit 13. The noise HMM(8)' and the HMM(4)" corresponding to only the line fluctuation are mixed by the PMC method, thereby obtaining an HMM(13). By converting the resultant HMM(13) into the Cepstrum expression by the conversion unit 14, an HMM(14)=$(y(t)^{cep})'$ adapted to the noise and line fluctuation is obtained. By using the HMM(14) obtained, the speech recognition unit 16 executes a speech recognition by a general speech recognizing method using the HMM. where, $(y(t)^{cep})' = \log[K_2 HMM(8)' + HMM(4)'']$ As an embodiment different from the above embodiment, a method whereby an adaptive mode and a recognition mode are not individually performed will now be described. In the construction of FIG. 1, the adaptive mode and the recognition mode are switched, and individually performed for the speech input for adaptation and the speech input for recognition. On the other hand, a construction in which the adaptive mode is not provided is also possible. FIG. 2 shows such a construction. When a recognition target vocabulary is inputted from the speech input unit 103, the data is divided into a speech portion and a non-speech portion and is transferred to an environment adaptation unit 18. The environment adaptation unit has the same construction as the constructions 5 to 14 described in FIG. 1. The HMM [corresponding to the HMM(4)] before adaptation stored in an HMM 17 is adapted by the environment adaptation unit 18, so that an HMM 19 after the adaptation [corresponding to HMM(14)] is obtained. By using such an HMM, the recognition target vocabulary is recognized by a speech recognition unit 20. Namely, different from the foregoing example, one input speech is used for both of the adaptation and the recognition.

What is claimed is:

1. A speech recognizing method comprising the steps of:

inputting a speech signal including a speech portion and a non-speech portion;

obtaining the mean of the time of the speech portion in the Cepstrum dimension from the speech portion included in the input speech;

obtaining the mean of the time of the non-speech portion in the Cepstrum dimension from the non-speech portion included in the input speech;

subtracting the mean of the time of the non-speech portion in the Cepstrum dimension from the mean of the time of the speech portion in the Cepstrum dimension on a linear spectrum dimension to obtain a first subtracted result;

converting the first subtracted result into a Cepstrum dimension; and subtracting the mean of the time of a speech portion in the Cepstrum dimension in a speech database for learning from the converted result to obtain a second subtracted result and adding the second subtracted result to a speech model expressed by a Cepstrum to obtain a modified speech model.

2. A method according to claim 1, further comprising the step of recognizing the input speech by using the modified speech model.

3. A method according to claim 2, further comprising the steps of performing speech recognition by a hidden Markov model.

4. A method according to claim 2, further comprising the step of displaying the result of speech recognition on display means.

5. A method according to claim 2, further comprising the step of printing the result of the speech recognition by printing means.

6. A method according to claim 1, wherein the mean of the time in the Cepstrum dimension is data of a hidden Markov model.

7. A method according to claim 1, further comprising the steps of adding and synthesizing a noise model expressed by Cepstrum parameters and the speech model expressed by the Cepstrum parameters in a linear spectrum dimension, thereby forming a noise multiplexed model, and using a mean value parameter of the noise model as a mean of the time of the non-speech portion in the Cepstrum dimension.

8. A method according to claim 1, further comprising the steps of using a memory in which a control program of each of the processes of said method has been stored, and executing each of the processes in accordance with the control program by using the memory.

9. A method according to claim 1, further comprising the step of inputting the speech by a microphone.

10. A method according to claim 1, further comprising the steps of inputting the speech from a terminal connected through a communication line and outputting the result of the speech recognition to the terminal connected through the communication line.

11. A speech recognizing apparatus comprising:

input means for inputting a speech signal including a speech portion and a non-speech portion;

speech portion mean time deriving means for deriving a mean of the time of the speech portion in the Cepstrum dimension from the speech portion included in the input speech;

non-speech portion mean time deriving means for deriving the mean of the time of the non-speech portion in the Cepstrum dimension from the non-speech portion included in the input speech;

linear spectrum processing means for subtracting the mean of the time of the non-speech portion in the Cepstrum dimension from the mean of the time of the speech portion in the Cepstrum dimension on a linear spectrum dimension to produce a first subtracted result;

converting means for converting the first subtracted result into a Cepstrum dimension to produce a converted result; and speech model deriving means for subtracting the mean of the time of a speech portion in the Cepstrum dimension in a speech database for learning from the converted result to produce a second subtracted result and adding the second subtracted result to a speech model expressed by a Cepstrum to produce a modified speech model.

12. An apparatus according to claim 11, further comprising speech recognizing means for recognizing the input speech by using the modified speech model obtained by said speech model deriving means.

13. An apparatus according to claim 12, wherein said speech recognizing means performs speech recognition by a hidden Markov model.

14. An apparatus according to claim 12, further comprising display means for displaying the result of the speech recognition by said speech recognizing means.

15. An apparatus according to claim 12, further comprising printing means for printing the result of the speech recognition by said speech recognizing means.

16. An apparatus according to claim 11, wherein the mean of the time in the Cepstrum dimension is data of a hidden Markov model.

17. An apparatus according to claim 11, further comprising:

noise multiplexed model forming means for adding and synthesizing a noise model that is expressed by Cepstrum parameters and the speech model expressed by the Cepstrum parameters on a linear spectrum dimension, thereby forming a noise multiplexed model, and wherein the linear spectrum processing means uses a mean value parameter of the noise model as a mean of the time of the non-speech portion in the Cepstrum dimension.

18. An apparatus according to claim 11, further comprising memory means in which a control program for each of the processes of said apparatus has been stored.

19. An apparatus according to claim 11, further comprising a microphone for inputting the speech signal.

20. An apparatus according to claim 11, further comprising communication control means for controlling said apparatus so as to input the speech signal from a terminal connected through a communication line and output the result of the speech recognition to the terminal connected through the communication line.

21. A storage medium which can be read by a computer and in which the following programs have been stored:

a program for inputting a speech signal including a speech portion and a non-speech portion;

a program for obtaining the mean of the time of the speech portion in the Cepstrum dimension from the speech portion included in the input speech;

a program for obtaining the mean of the time of the non-speech portion in the Cepstrum dimension from the non-speech portion included in the input speech;

a program for subtracting the mean of the time of the non-speech portion in the Cepstrum dimension from the mean of the time of the speech portion in the Cepstrum dimension on a linear spectrum dimension to produce a first subtracted result;

a program for converting the first subtracted result into a Cepstrum dimension to produce a converted result; and a program for subtracting the mean of the time of a speech portion in the Cepstrum dimension of a speech data base for learning from the converted result to produce a second subtracted result and adding the second subtracted result to a speech model expressed by Cepstrum.

22. A program which can be read out a computer, wherein the program instructs the computer to perform the steps of:

inputting a speech signal including a speech portion and a non-speech portion;

obtaining a mean of the time of the speech portion in the Cepstrum dimension from the speech portion included in the input speech;

obtaining a mean of the time of the non-speech portion in the Cepstrum dimension from the non-speech portion included in the input speech;

subtracting the mean of the time of the non-speech portion in the Cepstrum dimension from the mean of the time of the speech portion in the Cepstrum dimension on a linear spectrum dimension to produce a first subtracted result;

converting the first subtracted result into a Cepstrum dimension; and subtracting a mean of the time of a speech portion in the Cepstrum dimension in a speech data base for learning from the converted result to produce a second subtracted result and adding the second subtracted result to a speech model expressed by Cepstrum.

* * * * *

UNITED STATES PATENT AND TRADEMARK OFFICE
CERTIFICATE OF CORRECTION

PATENT NO. : 5,924,067

DATED : July 13, 1999

INVENTOR(S): TETSUO KOSAKA, ET AL.

It is certified that error appears in the above-identified patent and that said Letters Patent is hereby corrected as shown below:

COLUMN 1:
Line 23, "noise such" should read --noise, such--.
Line 47, "of an" should read --an--.

COLUMN 2:
Line 3, "HMM," should read --HMM--.
Line 4, "HMM" should read --HMM,--.

COLUMN 5:
Line 29, "to" should read --by--.
Line 39, "HMM. Where," should read --HMM, where--.
Line 61, "of" should be deleted.
COLUMN 8:
Line 26, "out" should read -- out by--.

Signed and Sealed this

Sixteenth Day of May, 2000

Q. TODD DICKINSON

*Attest:*

*Attesting Officer*  *Director of Patents and Trademarks*